United States Patent
Kapila et al.

(10) Patent No.: US 11,975,297 B2
(45) Date of Patent: May 7, 2024

(54) CONTINUOUS EXTRUDED SOLIDS DISCHARGE

(71) Applicant: Halliburton Energy Services, Inc., Houston, TX (US)

(72) Inventors: Rajesh C. Kapila, Houston, TX (US); Barry Hoffman, Wilcox (CA)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/856,874

(22) Filed: Apr. 23, 2020

(65) Prior Publication Data

US 2020/0398235 A1 Dec. 24, 2020

(51) Int. Cl.
*E21B 21/06* (2006.01)
*B01F 23/50* (2022.01)
(Continued)

(52) U.S. Cl.
CPC ............ *B01F 27/722* (2022.01); *B01F 23/53* (2022.01); *B01F 23/54* (2022.01); *B01F 23/707* (2022.01);
(Continued)

(58) Field of Classification Search
CPC ...... B01F 27/722; B01F 27/723; B01F 23/53; B01F 23/54; B01F 23/707; B01F 23/565;
(Continued)

(56) References Cited

U.S. PATENT DOCUMENTS

| 4,319,410 | A | | 3/1982 | Heilhecker et al. |
| 4,595,422 | A | * | 6/1986 | Hill ........................ B08B 3/042 |
| | | | | 134/40 |

(Continued)

*Primary Examiner* — Abby J Flynn
*Assistant Examiner* — Yanick A Akaragwe
(74) *Attorney, Agent, or Firm* — Tenley Krueger; Parker Justiss, P.C.

(57) ABSTRACT

A device for processing oil or gas well waste solids, the device including a pressurizing discharge unit having a casing. The casing includes a solids inlet and a water inlet. The solids inlet receives treated solids into a front end of the casing, where the treated solids are exposed to a reduced pressure in an internal chamber of the casing of less than atmospheric pressure. The water inlet receives water and adds the water to the treated solids in the internal chamber. The casing includes an extruder screw unit, the extruder screw unit having progressive screw sections located inside the internal chamber and corresponding to conveying mixing and pressurizing screw sections. The conveying screw section conveys the treated solids along a long axis length of the extruder screw unit from the solids inlet towards a discharge end of the casing while the reduced pressure is maintained, the mixing screw section mixes the treated solids and the water together to form a paste, and the pressurizing screw section conveys the paste towards the discharge end and generates, in a portion of the casing downstream from the mixing screw section, a backpressure that is greater than atmospheric pressure. The casing includes a die assembly to extrude the paste through an orifice of the die assembly located at the discharge end while maintaining the backpressure on the paste in the internal chamber. Method and system embodiments for processing oil or gas well waste solids are also disclosed.

20 Claims, 4 Drawing Sheets

(51) Int. Cl.
*B01F 23/53* (2022.01)
*B01F 23/70* (2022.01)
*B01F 27/722* (2022.01)
*B01F 27/723* (2022.01)
*B01F 35/71* (2022.01)
*B09B 3/40* (2022.01)
*B09B 3/80* (2022.01)
*E21B 21/00* (2006.01)
*B01F 101/25* (2022.01)
*B01F 101/49* (2022.01)

(52) U.S. Cl.
CPC ...... *B01F 27/723* (2022.01); *B01F 35/71775* (2022.01); *B09B 3/40* (2022.01); *B09B 3/80* (2022.01); *E21B 21/001* (2013.01); *E21B 21/066* (2013.01); *B01F 23/565* (2022.01); *B01F 35/71705* (2022.01); *B01F 2101/25* (2022.01); *B01F 2101/49* (2022.01)

(58) Field of Classification Search
CPC .......... B01F 35/71775; B01F 35/71705; B01F 2101/25; B01F 2101/49; B09B 3/40; B09B 3/80; B09B 3/20; B09B 3/00; B09B 5/00; E21B 21/001; E21B 21/006; E21B 21/06
See application file for complete search history.

(56) References Cited

U.S. PATENT DOCUMENTS

| | | |
|---|---|---|
| 4,752,135 A | 6/1988 | Loomans |
| 5,017,269 A | 5/1991 | Loomans et al. |
| 5,110,457 A | 5/1992 | Krawl et al. |
| 5,164,207 A | 11/1992 | Durina |
| 5,544,951 A | 8/1996 | Alack |
| 6,220,745 B1 | 4/2001 | Kobayashi et al. |
| 8,496,189 B2 | 7/2013 | Lomond et al. |
| 2003/0159310 A1* | 8/2003 | Hensley ............ B09C 1/02 34/367 |
| 2009/0277632 A1* | 11/2009 | Frazier ............ E21B 21/066 166/267 |
| 2014/0000720 A1 | 1/2014 | Mortzheim et al. |
| 2014/0110358 A1 | 4/2014 | Lang |
| 2015/0060044 A1 | 3/2015 | Scharmach et al. |
| 2015/0338162 A1* | 11/2015 | Hoffman ............ C10G 33/00 34/236 |
| 2016/0059194 A1 | 3/2016 | Smith |
| 2016/0265322 A1 | 9/2016 | Beg |
| 2018/0010031 A1 | 1/2018 | Galindo et al. |
| 2019/0106972 A1 | 4/2019 | Sanborn et al. |

* cited by examiner

CONTINUOUS EXTRUDED SOLIDS DISCHARGE

CROSS-REFERENCE TO RELATED APPLICATION

This application is a continuation of and claims priority to International Application Serial No. PCT/US2019/038416 filed on Jun. 21, 2019, and entitled "CONTINUOUS EXTRUDED SOLIDS DISCHARGE," which is commonly assigned with this application and incorporated herein by reference in its entirety.

BACKGROUND

As oil and gas well drilling fluids are used, downhole waste solids accumulate. The environmentally safe and cost-effective removal of such waste solids is important to the efficient operation of oil and gas well drilling systems.

BRIEF DESCRIPTION

Figure 1:
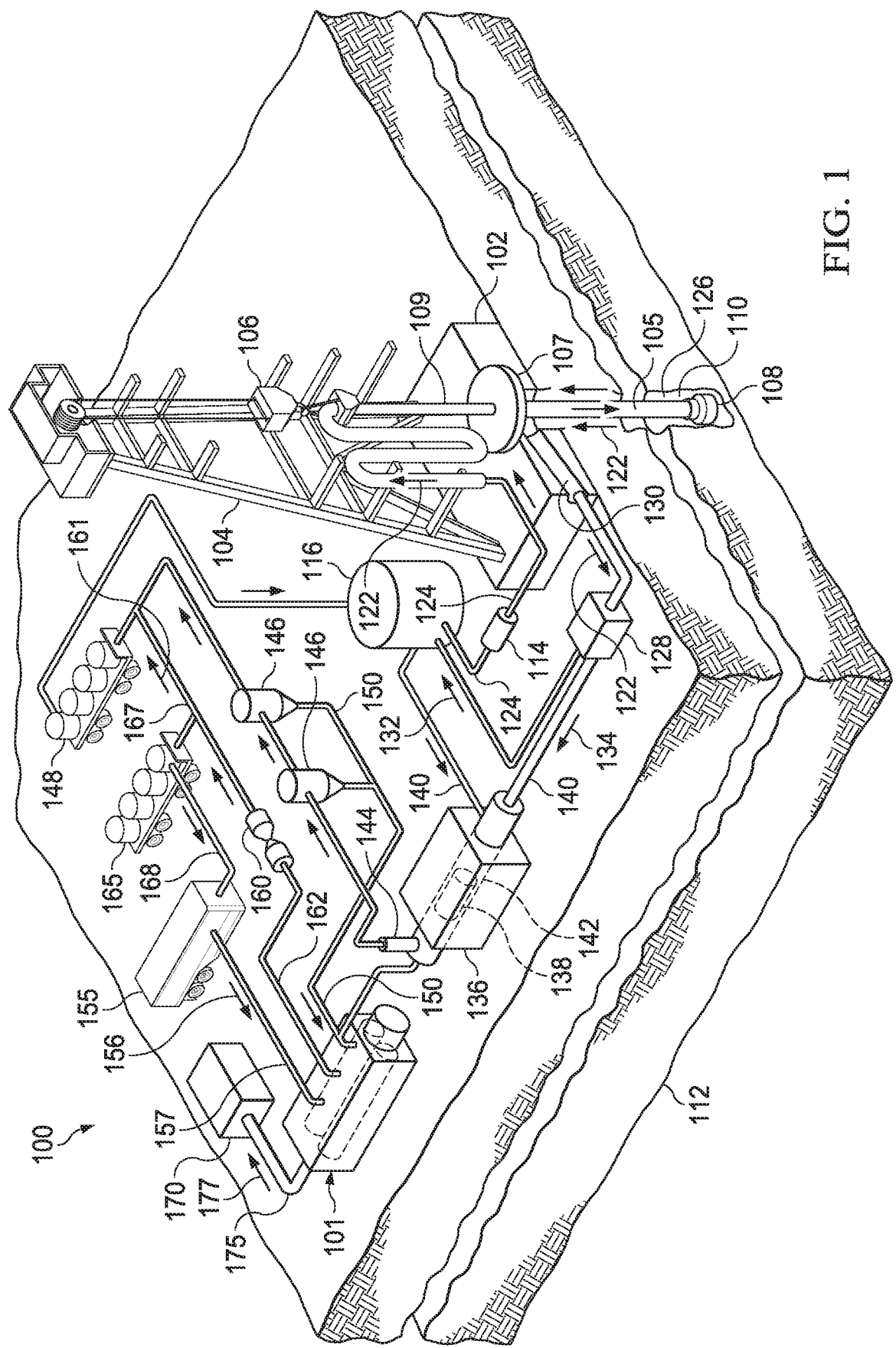
Figure 2:
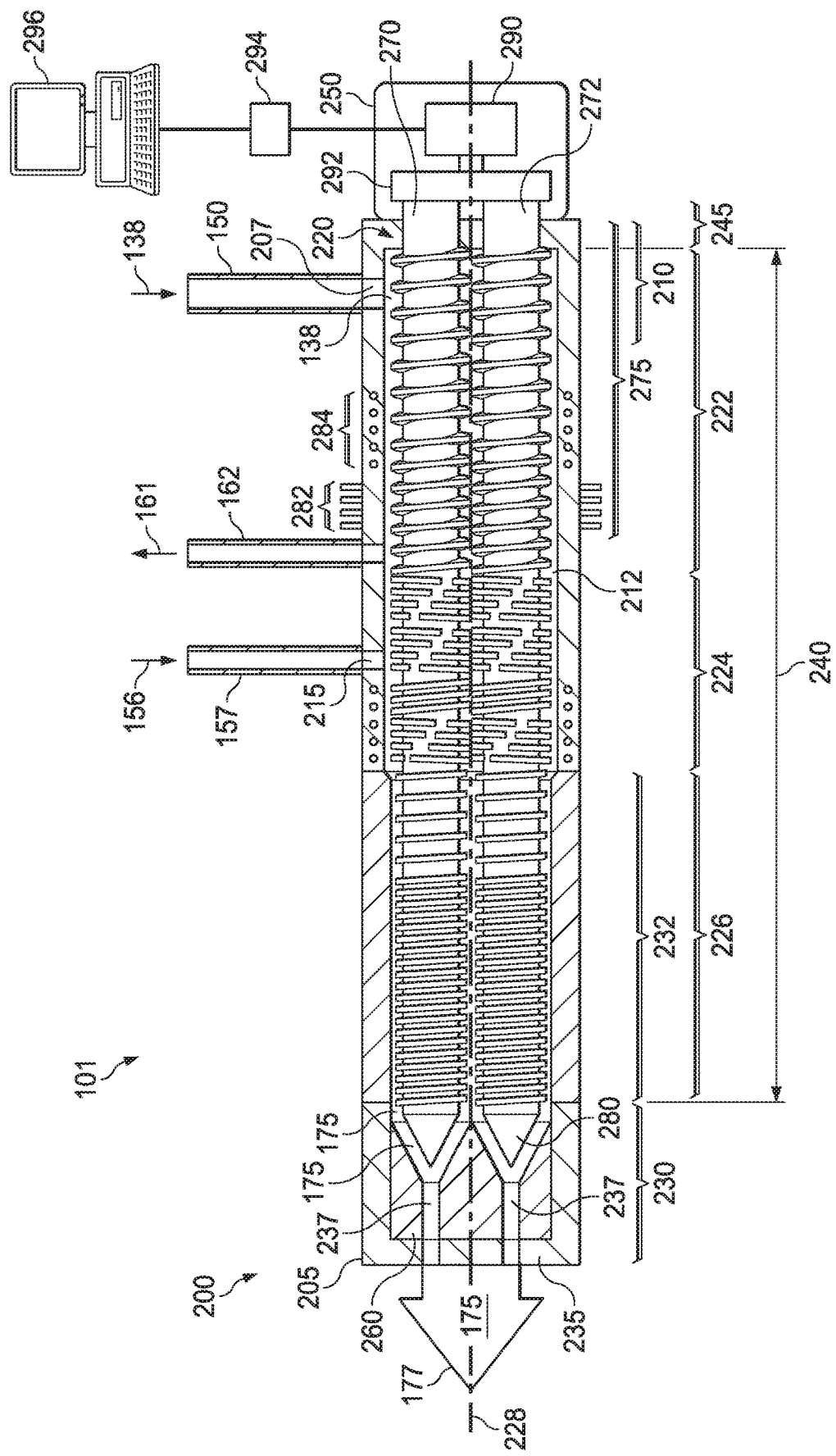
Figure 3:
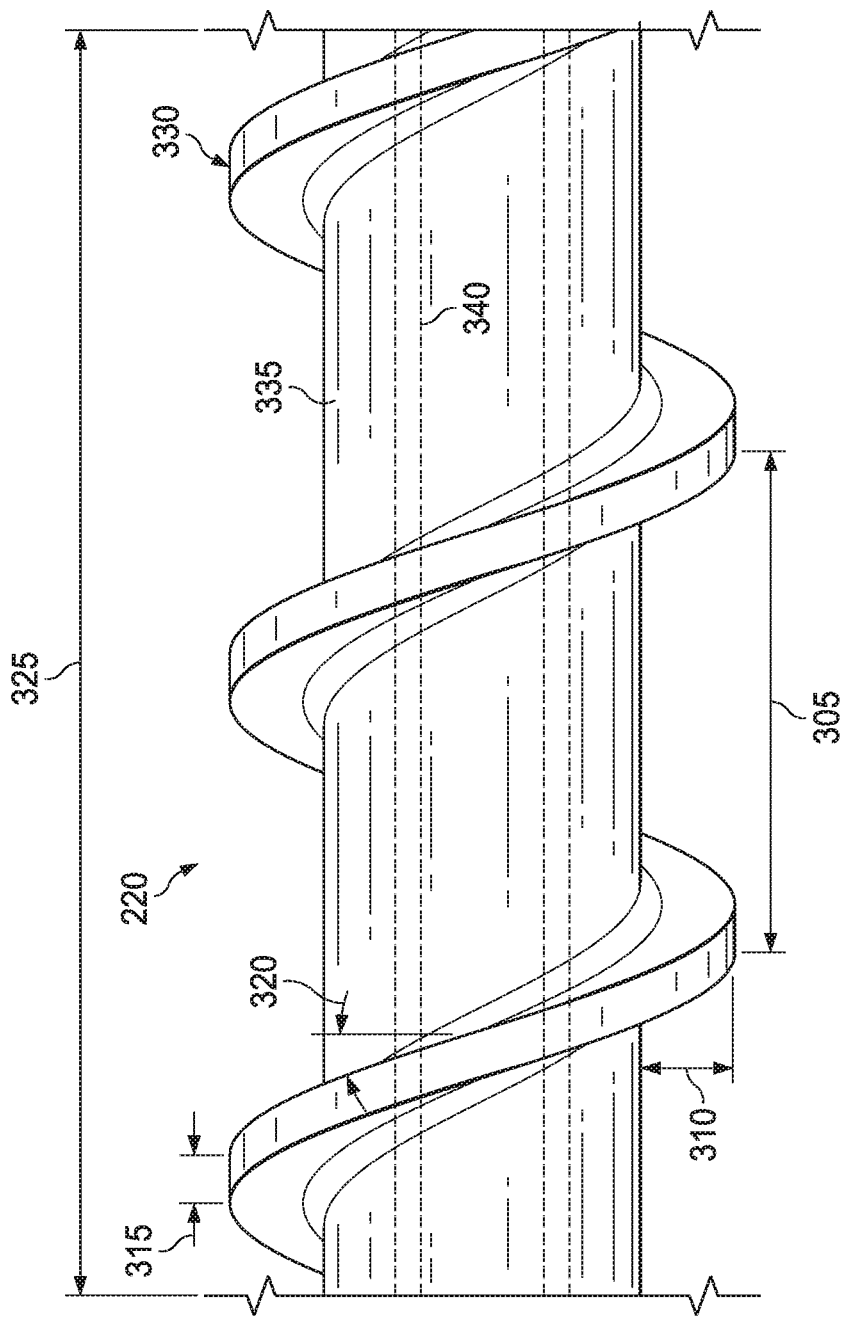
Figure 4:
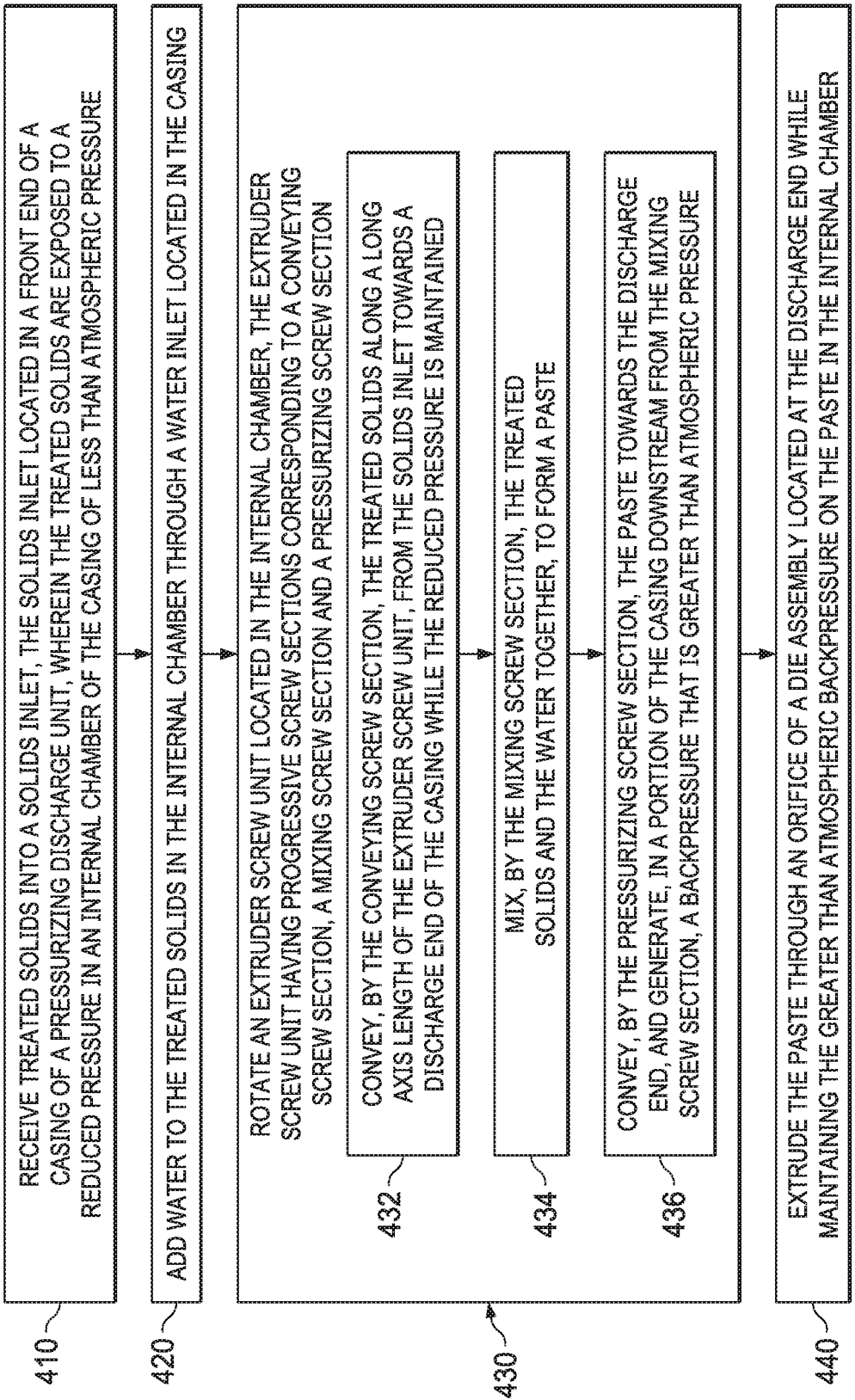

Reference is now made to the following descriptions taken in conjunction with the accompanying drawings, in which:

FIG. 1 presents a schematic view of an illustrative embodiment of an oil and gas well drilling system, using a device and method for processing oil or gas well waste solids in accordance to embodiments of the disclosure;

FIG. 2 presents a cross-sectional view of a device for processing oil or gas well waste solids including any embodiments of the device used in the oil and gas well drilling system disclosed in the context of FIG. 1;

FIG. 3 presents a perspective view of a portion of an extruder screw unit of the device for processing oil or gas well waste solids such as disclosed in the context of FIGS. 1-2, to illustrate and define aspects of screw geometry; and FIG. 4 presents a schematic flowchart of an illustrative embodiment of a method for processing oil or gas well waste solids, including processing solid using any embodiments of the device and system disclosed in the context of FIGS. 1-3.

DETAILED DESCRIPTION

The present disclosure relates generally to the field of oil or gas well waste solids processing devices and methods, and more specifically, to processes for the removal and dust mitigation of waste solids.

As part of the present disclosure we recognized that the processing of waste solids can be facilitated by rewetting treated forms of the waste solids and maintaining the rewetted treated solids in a reduced pressure environment while forming a paste. The paste can then be discharged into a waste container for removal from a drilling site and transfer to a landfill site while minimizing the generation of air-born solid dust can reduce health hazards to personal at drilling site and improve the safety of operating equipment at the site. Moreover, the processing of such waste solids can be a continuous process by using a device that receives a flow of solids while maintaining the reduced pressure and wetting the solids to form the paste and continuously extrudes the paste as discharge from the device.

FIG. 1 presents a schematic view an illustrative embodiment of an oil and gas well drilling system 100 of the disclosure, the system 100 using any device 101 or method embodiments for processing oil or gas well waste solids as disclosed herein. FIG. 1 generally depicts a land-based drilling system. Those skilled in the pertinent art would understand the system components described herein are equally applicable to water-based drilling system for subsea drilling operations employing floating or sea-based platforms and rigs, without departing from the scope of the disclosure.

As illustrated, the drilling system 100 may include a drilling platform 102 that supports a derrick 104 having a traveling block 106 for raising and lowering a drill string 105. The drill string 105 may include, but is not limited to, drill pipe and coiled tubing, as generally known to those skilled in the art. A kelly 109 may support the drill string 105 as it is lowered through a rotary table 107. A drill bit 108 may be attached to the distal end of the drill string 105 and may be driven either by a downhole motor and/or via rotation of the drill string 105 from the well surface. The drill bit 108 may include, but is not limited to, roller cone bits, polycrystalline diamond compact (PDC) bits, natural diamond bits, any hole openers, reamers, coring bits, etc. As the drill bit 108 rotates, it may create a wellbore 110 that penetrates various subterranean formations 112.

One or more pumps 114 (e.g., a mud pump) and reservoirs 116 (e.g., a mud pit) of the system 100 can provide an oil or gas well drilling fluid 122. For instance, the fluid 122 can include constituents such as drilling mud or oil-based slurry compositions include oil, water and solids, or other fluids, as familiar to those skilled in the pertinent art. The pump 114 can circulate the fluid 122 through flow conduits 124 to the kelly 109, which in turn conveys the fluid 122 downhole through the interior of the drill string 105 and through one or more orifices in the drill bit 108. The fluid 122 may then be circulated back to the surface via an annulus 126 defined between the drill string 105 and the walls of the wellbore 110.

At the surface, the fluid 122 returning from the well bore 110 may exit the annulus 126 and be conveyed to the fluid processing unit 128 via an interconnecting flow line 130. The fluid processing unit 128 may include, but is not limited to, a shaker unit to facilitate separating the oil or gas well drilling fluids into a phase of liquid 132 and a phase of waste solids 134. The shaker unit can include one or more vibrating sieves with a wire-cloth screen configured to vibrate while the returning oil or gas well drilling fluids 122 flows on top of it such that components of the fluid 122 that are smaller than the wire mesh pass through the screen (e.g., number 150, 200 and/or 300 screen sizes) as the phase of liquid 132, while the phase of waste solids 134 includes the components that are retained by the wire mesh. As familiar to those skilled in pertinent arts, some embodiments of the fluid processing unit 128 can further include centrifuges, separators, desilters, desanders, or filters to facilitate the further separation into the liquid and waste solid 132, 134.

The liquid 132 can be transported from the fluid processing unit 128 to the reservoir 116 for reuse as part of the drilling fluid 122 while the waste solid 134 can be transported to a thermal extraction unit 136 for further processing to form treated solids 138.

Additionally, as the liquid phase 132 is recovered and reused as part the drilling fluid 122, the eventual accumulation of large quantities of ultrafine particles (e.g., having an average particle size of 50, 10 or 5 microns or less in some embodiments), often referred to a low gravity solids, eventually renders the liquid phase no longer useful as a drilling fluid. In such cases, the liquid 132 may then deemed to be a spent drilling fluid and the low gravity solids in the liquid 132 can be further processed and become part of the waste solids 134 transferred to the thermal extraction unit 136.

For instance, the waste solids 134 can be transported via a feed line 140 to the thermal extraction unit 136 which is configured to treat the waste solids 134 by extracting valuable hydrocarbon and water vapor from the waste solids with the reminder forming treated solids 138. For instance, the thermal extraction unit 136 can include a thermal extraction barrel 142 configured to heat and expose the waste solids 134 to a turbulent thin film flow regime while maintaining the reduced pressure to facilitate extracting the hydrocarbon and water vapor from the waste solids 134.

The extracted hydrocarbon and water vapor can be transported via vent tube 144 for further processing in cyclone separators 146 to further extract the hydrocarbon and water vapor which can then be transported to a condenser unit 148. In some embodiments, the condensed liquid water or hydrocarbon may be sent to from the condenser unit 148 to the reservoir 116 for reuse as part of formulating the drilling fluid 122, e.g., serving as a fluid premix.

A flow conduit 150 can be connected to transport the treated solids 138 to the device 101, such as further disclosed in the context or FIG. 2-3 below. The flow conduit 150 can be connected to directly transport the treated solids 138 from the thermal extraction unit 136 to the device 101 while maintaining the reduced pressure. In some embodiments, the flow conduit can be additionally connected to transport the treated solid, e.g., solids remaining in the cyclone separators 146 after the further extraction of hydrocarbon and water vapor, from the cyclone separators 146 to the device 101 while maintaining the reduced pressure.

Embodiments of the system 100 (or as part some embodiments of the device 101) can further include: a container 155 connected to supply liquid water to device 101 (e.g., water 156 via flow conduit 157), an eductor 160 connected (e.g., water vapor 161 via a vent tube 162) to remove water vapor generated in the device 101, a condenser (e.g., a second condenser 165 or the same condenser 148 as discussed above) connected to receive steam from the eductor 160 (e.g., water vapor 166 via a vent tube 167) and connected to deliver liquid water to the container 155 (e.g., via a flow conduit 168), and, a waste container 170 connected to receive paste 175 discharged (e.g., paste continuously extruded to a feed line 177) from the device 101.

The term waste solids, as used herein, refers to solids separated from drilling fluid that has returned from a well bore and/or low gravity solid recovered from spent drilling fluid. As familiar to those skilled in art, waste solids can include solid particulate objects, including limestone, shale, clay, bentonite objects, of all shapes, composition and morphology present in drilling fluid and downhole formation cuttings and well as hydrocarbons and water that resides on or in such solids. For instance, in some embodiments, the waste solids can have a hydrocarbon content of greater than 5 wt % and/or water content of greater than 1 wt %.

The term treated solids, as used herein, refers waste solids that have been processed to extract hydrocarbons and water. For instance, in some embodiments, the waste solids are thermally treated in a reduced pressure environment (e.g., as processed in a thermal extraction unit 136 and one of more optional cyclone units 146a, 146b to remove hydrocarbons and water to form the treated solids. E.g., in some embodiments, the resulting treated solids have a hydrocarbon content of 5, 4 or 1 wt % or less or less and a water content of 1 or 0.1 wt % or less.

The term paste, as used herein, refers to a rehydrated mass of the treated solids (e.g., containing from 5 to 75 wt % water, depending upon the average water absorptivity of the treated solids) that forms a soft pliable mixture capable of being continuously extruded from the device 101. In some embodiments, the paste can have a density in a range from about 800 to 2800 $kg/m^3$ or in some embodiments, 800 to 1400, or 1400 to 2200, or 2200 to 2800 $kg/m^3$.

With continuing reference to FIG. 1 throughout, FIG. 2 presents a cross-sectional view of a device 101 for processing oil or gas well waste solids, including any embodiments of the device 101 used in the oil and gas well drilling system 101 disclosed in the context of FIG. 1 or in the method discussed in the context of FIG. 4.

The device 101 includes a pressurizing discharge unit 200 having a casing 205. The casing 205 includes a solids inlet 207 configured to receive treated solids 138 (e.g., via conduit 150) into a front end 210 of the casing 205. In an internal chamber 212 of the casing 205 (e.g., an enclosed chamber sealed to the external environment), the treated solids 138 are exposed to a reduced pressure of less than atmospheric pressure (e.g., less than 1 atm, less than 0.9 atm, or less than 0.8 atm). The pressurizing discharge unit 200 also includes a water inlet 215 configured to receive water 156 (e.g., via conduit 157) and add the water 156 to the treated solids 138 in the internal chamber 212. The pressurizing discharge unit 200 also includes an extruder screw unit 220, the extruder screw unit 220 having progressive screw sections located inside the internal chamber 212 and corresponding to a conveying screw section 222, a mixing screw section 224 and pressurizing screw section 226.

The screw conveying section 222 can be configured to convey the treated solids 138 along a long axis (e.g., axis 228) of the extruder screw unit 220 from the solids inlet 207 towards a discharge end 230 of the casing 205 while the reduced pressure is maintained. The mixing screw section 224 can be configured to mix the treated solids 138 and the water 156 together to form a paste 175. The pressurizing screw section 226 can be configured to convey the paste 175 towards the discharge end 230 and to generate, in a portion of the casing 232 downstream from the mixing screw section 224, a backpressure that is greater than atmospheric pressure (e.g., greater than 1 atm, greater than 1.1 atm, or greater than 1.2 atm).

The pressurizing discharge unit 200 also includes a die assembly 235 configured to extrude the paste 175 from an orifice (e.g., one or more orifices 237) of the die assembly 235 located at the discharge end 230 while maintaining the backpressure on the paste 175 in the chamber 212.

One skilled in the pertinent art would appreciate that all three of the screw sections 222, 224, 226 may be capable of conveying, mixing and pressurizing solids although the tendencies of these capabilities are configured to be different between the different section. For instance, the conveying screw section 222 is capable of conveying a larger unit mass of treated solid 138 or paste 175 per unit length and unit time along the long axis 228 than either the mixing screw section 224 or the pressurizing screw section 226. The mixing screw section 224 is capable of forming a homogenous mixture of solid and water more rapidly than either the conveying screw section 222 or the pressurizing screw section 226. The pressurizing screw section 226 is capable of generating the backpressure more rapidly than either the conveying screw section 222 or the mixing screw section 224. The extruder screw unit 220 can have various screw geometry arrangements for the different screw sections 222, 224, 226 to achieve the desired tendencies for conveying, mixing and pressurization, respectively.

To facilitate disclosure of certain aspects the extruder screw unit's 220 geometries, FIG. 3 presents a perspective view of a portion of an extruder screw unit 220 of the device 101 for processing oil or gas well waste solids such as disclosed in the context of FIGS. 1-2, to illustrate and define aspects of screw geometry. The extruder screw unit 220 portion generally depicted in FIG. 1 could correspond to any section or portion of the section of the conveying screw section 222, mixing screw section 224 or pressurizing screw section 226.

With continuing reference to FIG. 2, as illustrated in FIG. 3, the arrangement of the screw sections 222, 224, 226 can be characterized in terms of screw geometry parameters corresponding to: pitch length 305, flight depth 310, flight width 315, helical angle of flight 320, internal length 325, or, the relative values of these parameters in the different screw section 222, 224, 226.

In some embodiments of the extruder screw unit 220, any of the screw sections 222, 224, 226 can have a pitch length 305 value in a range from 5 to 240 mm, from 10 to 175 mm or from 20 to 100 mm. In some embodiments, the conveying screw section 222 can have a pitch length 305 that is longer than a pitch length 305 of the mixing screw section 224 (e.g., at least 5, 10, 20, 30, 40 or 50 percent longer), and, that is longer than a pitch length 305 of the pressurizing screw section 226 (e.g., at least 5, 10, 20, 30, 40 or 50 percent longer), and, the pitch length 305 of the pressurizing screw section 226 can be longer than the pitch length 305 of the mixing screw section 224 (e.g., at least 5, 10, 20, 30, 40 or 50 percent longer).

In some embodiments of the extruder screw unit 220, any of the screw sections 222, 224, 226 can have a flight depth 310 value in a range from 1 to 40 mm, from 5 to 30 mm or from 8 to 20 mm. In some embodiments, the conveying screw section 222 can have a flight depth 310 that is deeper than a flight depth 310 of the mixing screw section 224 and that is deeper than a flight depth 310 of the pressurizing screw section 226, and, the flight depth 310 of the mixing screw section 224 can be deeper than the flight depth 310 of the pressurizing screw section 226

In some embodiments of the extruder screw unit 220, any of the screw sections 222, 224, 226 can have a flight width 315 value in a range from 1 to 20 mm, from 2 to 15 mm or from 3 to 10 mm. In some embodiments, the conveying screw section 222 can have a flight width 310 that is narrower than a flight width 310 of the mixing screw section (e.g., at least 5, 10, 20, 30, 40 or 50 percent narrower) and that is narrower than a flight width 310 of the pressurizing screw section 226 (e.g., at least 5, 10, 20, 30, 40 or 50 percent narrower). In some embodiments, a flight width 310 of the mixing screw section 224 can be wider (e.g., at least 5, 10, 20, 30, 40 or 50 percent wider) or narrower (e.g., at least 5, 10, 20, 30, 40 or 50 percent wider) than the flight width 310 of the conveying screw section 222 and the flight width 310 of the pressurizing screw section 226.

In some embodiments of the extruder screw unit 220, any of the screw sections 222, 224, 226 can have a helical angle of flight 320 value in a range from 0 to 90 degrees. In some embodiments, the conveying screw section 222 can have a helical angle of flight 320 that is greater than a helical angle of flight 320 of the pressurizing screw section 226 (e.g., at least 5, 10, 20, 30, 40 or 50 percent greater). In some embodiments, a helical angle of flight 320 of the mixing screw section 224 can be greater (e.g., at least 5, 10, 20, 30, 40 or 50 percent greater) or less (e.g., at least 5, 10, 20, 30, 40 or 50 percent less) than the helical angle of flight 320 of the conveying screw section 222 and the helical angle of flight 320 of pressurizing screw section 226.

In some embodiments of the extruder screw unit 220, any of the screw sections 222, 224, 226 can have a number of flights per 1 mm unit length of pitch 305 having a value in a range from 1 to 100, from 1 to 50, or from 1 to 2.

In some embodiments of the extruder screw unit 220, each of the screw sections 222, 224, 226 can have a constant pitch length 305, flight depth 310, flight width 315 and helical angle 320 throughout an internal length 325 of the each of the respective sections 222, 224, 226.

In some embodiments of the extruder screw unit 220, the conveying screw section has an internal length 325 that is in a range from about 50 to 75 percent of a total length 240 of the extruder screw unit 220 in the internal chamber 212 of the casing 205, the mixing screw section 224 has an internal length 325 that is in a range from about 12 to 50 percent of the total length 240 and the pressurizing screw section 226 has an internal length 325 that is in a range from about 12 to 50 percent of the total length 240.

Some embodiments of the extruder screw unit 220 include a single continuous screw having the conveying screw section, the mixing screw section, and the pressurizing screw section. That is, the extruder screw unit 220 has no non-flight sections along the entire length of the extruder screw unit with the exception of embodiments having a first portion 245 of the extruder screw unit 220 that is coupled to a drive module 250 configured to turn the extruder screw unit.

In some embodiments, the extruder screw unit 220 includes two or more continuous screws (e.g., screws 270, 272) each having parallel internal lengths 225 of the conveying screw section 222, the mixing screw section 224, and the pressurizing screw section 226. The screws can be configured to rotate the same direction, or counter-rotate (rotate in opposite directions). In some such embodiments, at least portions of the two or more of the screws 270, 272 are intermeshed with each other. The term intermeshed, as used herein, refers to the flights (e.g., flight 330, FIG. 3) of one screw extending generally toward the shaft (e.g., shaft 335, FIG. 3) of the other screw and that at least a portion of each flight moves between two neighboring screw flights on the other shaft as the shafts rotate. The degree of intermeshing between the two or more screws 270, 272 can be another screw geometry parameter to facilitate the conveying, mixing and pressurizing tendencies of the screw sections 222, 224, 226. In some embodiments of the extruder screw unit 220, a portion of the lengths 325 of any of the screw sections 222, 224, 226 of one screw 270 that is intermeshed with correspond same screw sections 222, 224, 226 of the other screw 272 can be a value ranging from 0 to 100 percent, 10 to 90 percent or 20 to 80 percent intermeshed. In some embodiments of the extruder screw unit 220, the conveying screw sections 222 of the two or more continuous screws 270, 272 are intermeshed with each other (e.g., 100 percent intermeshed), the mixing screw sections 224 are not intermeshed with each other (e.g., 0 percent intermeshed) and the pressurizing screw sections 226 are intermeshed with each other (e.g., 100 percent intermeshed).

In some embodiments of the device 101, to facilitate extruding the paste 175 from the orifice 237 located at the discharge end 230, while maintaining the backpressure greater than atmospheric pressure on the paste 175, the size of the orifice is reduced relative to the size of the internal chamber 212 to thereby restrict the flow of the paste 175.

Moreover, extruding a paste 175 from the orifice 237 facilitates maintaining the reduced pressure in the portion 275 of the internal chamber 212 upstream from the mixing screw section 224.

For instance, in some embodiments, a cross-sectional area of the internal chamber 212 in the portion 232 of the casing 205 downstream from the mixing screw section 224 (e.g., the portion 232 of the casing housing the pressurizing section 226) is greater than a cross-sectional area of the orifice (e.g., the sum of the cross-sectional areas of orifices 237). For instance, in some embodiments, a ratio of the cross-sectional area of the internal chamber 212 located in the portion 232 of the casing downstream from the mixing screw section 224 to the cross-sectional area of the orifice 237 is a value in a range from about 2:1 to 10:1. For instance, when the total cross-section area of the orifice 237 equals about 1.6 inch$^2$ (e.g., two orifices each having a diameter of 1 inch) then the cross-sectional area of the portion 232 of the casing can range from 3.2 to 16 inch$^2$ (e.g., the portion 232 internal chamber 212 having a diameter from 2 to 4.5 inches).

In some such embodiments, to facilitate adjusting the ratio, the cross-sectional area of the orifice 237 can be adjustable. E.g., the die assembly 235 can be configured to hold die plates with different sizes of orifice 237 can be swapped in and out of the device 101. Additionally or alternatively, the die assembly 235 can include a spring-loaded die plate or pneumatic valve configured to provide a flow resistance to the flow of paste 175 to thereby to facilitate generating the back pressure. For instance, the die assembly 235 can be configured to include a spring-loaded or pneumatic valve, e.g., including one or more cavities 260 each shaped to form a tapered seat to receive a spring-loaded or pneumatic cone-shaped poppet valve 280. In some such embodiments, the ratio of the cross-sectional area of the internal chamber 212 located in the portion 232 of the casing downstream from the mixing screw section 224 to the cross-sectional area of the orifice 237 may be less than 2:1 or equal 1:1.

Embodiments of the device 101 can include features to mitigate the formation of steam in the internal chamber 212 of the casing. Generating steam could negatively effect maintaining the reduced pressure in the device 101 and in parts of the system 100 feeding the treated solids into the device, e.g., the flow conduits 150, the cyclone separators 146 or the thermal extraction barrel 142. For instance, in some embodiments, the casing 205 includes cooling fins 282 (e.g., metal fins), or a cooling coil 284 configured circulate a cooling fluid there-through (e.g., water or glycol water), to thereby reduce the internal chamber 212 temperature to a temperature (e.g., less than 100° C. or less than 90° C. or less than 80° C.) that prevents steam generation inside the internal chamber 212. In some embodiments, the cooling coil 284 can be integrated into walls of the casing 205 while in other embodiments the cooling coil can be wrapped around an exterior surface of the casing 205. In some embodiments, from 10 to 50 percent of a total length of the casing 205 as measured from to front end 210 towards the discharge end 230 can include the cooling fins 282 and/or the cooling coil 284. Alternatively or additionally, in some embodiments, a cooling loop 340 (FIG. 3) configured circulate the cooling fluid there-through can be located inside the shaft 335 of one or more of the screws 270, 272 of the extruder screw unit 220 (FIG. 2).

Alternatively or additionally, in some embodiments, to remove steam that is generated in the internal chamber 212, the casing 205 can further include a steam outlet 280. In some embodiments, the steam outlet 288 can be located between the solids inlet 207 and the water inlet 215. In some embodiments, the steam outlet 288 can be connected (via vent tube 162) to an eductor 160, the eductor 160 configured to condense steam exiting the steam outlet 288 (e.g., by produce a reduced pressure in the eductor 160).

Embodiments of the device 101 can further include a drive module 250. The drive module 250 can include a motor 290 and gearbox 292 coupled to the extruder screw unit 220, the motor 290 configured to rotate screws 270, 272 of the screw unit 220 and the gear box 292 configured to adjust a rotational speed and rotational direction of the screws 270, 272. In some embodiments, the drive unit 250 can further include a torque sensor 294 coupled to the motor 290 and configured to measure the torque applied by the motor 290 while rotating the screws 270, 272. The torque sensor 294 can be configured to convert the measurements of torque to digital information which is then transmitted to a computer processor 296 of the device 101. Based on the measurements of torque, the computer processor 296 can be programmed to control the amount of power used to operate the motor 290 and/or to change a gear of the gear box 292 to adjust the rotational speed or rotational direction of the screws 270, 272, e.g., to maintain a desired backpressure in the internal chamber 212.

Another embodiment of the disclosure is a method for processing oil or gas well waste solids, the method including processing waste solids using any embodiments of the device 101 and system 100 disclosed in the context of FIGS. 1-3. FIG. 4 presents a schematic flowchart of an illustrative embodiment of a method 400 for processing oil or gas well waste solids in accordance with the disclosure.

With continuing reference to FIGS. 1-3 throughout, the method 400 includes receiving treated solids 138 into a solids inlet 207 (step 410), the solids inlet 207 located in a front end 210 of a casing 205 of a pressurizing discharge unit 200, where in an internal chamber 212 of the casing 205, the treated solids 138 are exposed to a reduced pressure of less than atmospheric pressure.

The method 400 further includes adding water 156 to the treated solids 138 in the internal chamber 212 through a water inlet 215 located in the casing 205 (step 420).

The method 400 also includes rotating an extruder screw unit 220 located in the internal chamber 212 (step 430). As discussed in the context of FIG. 2, the extruder screw unit 220 has progressive screw sections corresponding to a conveying screw section 222, a mixing screw section 224 and a pressurizing screw section 226. As part of rotating extruder screw unit 220 (step 430) the treated solids 138 are conveyed along a long axis length 228 of the extruder screw unit 220, by the conveying screw section 222, from the solids inlet 207 towards a discharge end 230 of the casing 205 while the reduced pressure is maintained (step 432), the treated solids 138 and the water 156 are mixed together, by the mixing screw section 224, to form a paste 175 (step 434), and, the paste 175 is conveyed towards the discharge end 230 and, in a portion 232 of the casing 205 downstream from the mixing screw section 224, a backpressure that is greater than atmospheric pressure is generated, by the pressurizing screw section 226 (step 436).

The method 400 further includes extruding the paste 175 through an orifice 237 of a die assembly 235 located at the discharge end 230 of the casing 205 while maintaining the greater than atmospheric backpressure on the paste 175 in the internal chamber 212 (step 440).

Those skilled in the art to which this application relates will appreciate that other and further additions, deletions, substitutions and modifications may be made to the described embodiments.

What is claimed is:

1. A device for processing oil or gas well waste solids, the device comprising:
   a pressurizing discharge unit having a casing, the casing including:
      a solids inlet configured to receive treated solids into a front end of the casing, wherein the treated solids are exposed to a reduced pressure in an internal chamber of the casing of less than atmospheric pressure;
      a water inlet configured to receive water and add the water to the treated solids in the internal chamber;
      an extruder screw unit, the extruder screw unit having progressive screw sections located inside the internal chamber and corresponding to:
         a conveying screw section configured to convey the treated solids along a long axis length of the extruder screw unit from the solids inlet towards a discharge end of the casing while the reduced pressure is maintained,
         a mixing screw section configured to mix the treated solids and the water together to form a paste, and
         a pressurizing screw section configured to convey the paste towards the discharge end and to generate, in a portion of the casing downstream from the mixing screw section, a backpressure that is greater than atmospheric pressure; and
      a die assembly configured to extrude the paste through an orifice of the die assembly located at the discharge end while maintaining the backpressure on the paste in the internal chamber.

2. The device of claim 1, wherein, the conveying screw section has a pitch length that is longer than a pitch length of the mixing screw section and longer than a pitch length of the pressurizing screw section, and, the pitch length of the pressurizing screw section is longer than the pitch length of the mixing screw section.

3. The device of claim 1, wherein, the conveying screw section has a flight depth that is deeper than a flight depth of the mixing screw section and that is deeper than a flight depth of the pressurizing screw section, and, the flight depth of the mixing screw section is deeper than the flight depth of the pressurizing screw section.

4. The device of claim 1, wherein, the conveying screw section has a flight width that is narrower than a flight width of the mixing screw section and narrower than a flight width of the pressurizing screw section.

5. The device of claim 1, wherein, the conveying screw section has a helical angle of flight that is greater than a helical angle of flight of the pressurizing screw section.

6. The device of claim 1, wherein each of the conveying screw section, the mixing screw section, and the pressurizing screw section have a constant pitch length, flight depth, flight width and helical angle throughout an internal length of the each of the respective sections.

7. The device of claim 1, wherein:
   the conveying screw section has an internal length that is in a range from about 50 to 75 percent of a total length of the screw unit in the chamber,
   the mixing screw section has an internal length that is in a range from about 12 to 50 percent of the total length, and
   the pressurizing screw section has an internal length that is in a range from about 12 to 50 percent of the total length.

8. The device of claim 1, wherein the extruder screw unit includes a single continuous screw having the conveying screw section, the mixing screw section, and the pressurizing screw section.

9. The device of claim 1, wherein the extruder screw unit includes two or more continuous screws each having parallel internal lengths of the conveying screw section, the mixing screw section, and the pressurizing screw section.

10. The device of claim 9, wherein at least portions of the two or more continuous screws are intermeshed with each other.

11. The device of claim 10, wherein the conveying screw sections of the two or more continuous screws are intermeshed with each other, the mixing screw sections are not intermeshed with each other and the pressurizing screw sections are intermeshed with each other.

12. The device of claim 1, wherein a cross-sectional area of the internal chamber located in the portion of the casing downstream from the mixing screw section is greater than a cross-sectional area of the orifice.

13. The device of claim 12, wherein a ratio of the cross-sectional area of the internal chamber located in the portion of the casing downstream from the mixing screw section to the cross-sectional area of the orifice is a value in a range from about 2:1 to 10:1.

14. The device of claim 1, wherein a cross-sectional area of the orifice is adjustable.

15. The device of claim 1, wherein the die assembly includes a spring loaded die plate or pneumatic valve configured to provide a flow resistance to generate the backpressure.

16. The device of claim 1, wherein the casing includes cooling fins, or a cooling coil configured circulate a cooling fluid there-through, to thereby reduce the internal chamber temperature to a temperature that prevents steam generation inside the internal chamber.

17. The device of claim 1, the casing further includes a steam outlet, the steam outlet located between the solids inlet and the water inlet, the steam outlet connected to an eductor, the eductor configured to condense steam exiting the steam outlet.

18. The device of claim 1, further including a drive module, the drive module including a motor and gearbox coupled to the extruder screw unit, the motor configured to rotate screws of the screw unit and the gear box configured to adjust a rotational speed and rotational direction of the screws.

19. A method for processing oil or gas well waste solids, the method comprising:
   receiving treated solids into a solids inlet, the solids inlet located in a front end of a casing of a pressurizing discharge unit, wherein the treated solids are exposed to a reduced pressure in an internal chamber of the casing of less than atmospheric pressure;

adding water to the treated solids in the internal chamber through a water inlet located in the casing;

rotating an extruder screw unit located in the internal chamber, the extruder screw unit having progressive screw sections corresponding to a conveying screw section, a mixing screw section and a pressurizing screw section, including:

conveying, by the conveying screw section, the treated solids along a long axis length of the extruder screw unit, from the solids inlet towards a discharge end of the casing while the reduced pressure is maintained, mixing, by the mixing screw section, the treated solids and the water together, to form a paste, and conveying, by the pressurizing screw section, the paste towards the discharge end, and generating, in a portion of the casing downstream from the mixing screw section, a backpressure that is greater than atmospheric pressure; and extruding the paste through an orifice of a die assembly located at the discharge end while maintaining the greater than atmospheric backpressure on the paste in the internal chamber.

20. An oil or gas well drilling system, the system comprising:

a feed line configured to transport waste solids to a thermal extraction unit, the thermal extraction unit configured to extract hydrocarbon and water vapor from the waste solids to form treated solids, wherein the treated solids are maintained at a reduced pressure of less than atmospheric pressure;

a flow conduit connected to transport the treated solids to a pressurizing discharge unit while maintaining the reduced pressure, wherein:

the pressurizing discharge unit has a casing, the casing including:

a solids inlet configured to receive treated solids into a front end of the casing, wherein the treated solids are exposed to a reduced pressure in an internal chamber of the casing of less than atmospheric pressure;

a water inlet configured to receive water and add the water to the treated solids in the internal chamber;

an extruder screw unit, the extruder screw unit having progressive screw sections located inside the internal chamber and corresponding to:

a conveying screw section configured to convey the treated solids along a long axis length of the extruder screw unit from the solids inlet towards a discharge end of the casing while the reduced pressure is maintained, a mixing screw section configured to mix the treated solids and the water together to form a paste, and a pressurizing screw section configured to convey the paste towards the discharge end and to generate, in a portion of the casing downstream from the mixing screw section, a backpressure that is greater than atmospheric pressure; and a die assembly configured to extrude the paste through an orifice of the die assembly located at the discharge end while maintaining the backpressure on the paste in the internal chamber.

* * * * *

UNITED STATES PATENT AND TRADEMARK OFFICE
CERTIFICATE OF CORRECTION

PATENT NO. : 11,975,297 B2
APPLICATION NO. : 16/856874
DATED : May 7, 2024
INVENTOR(S) : Rajesh C. Kapila and Barry Hoffman It is certified that error appears in the above-identified patent and that said Letters Patent is hereby corrected as shown below:

In the Specification
After:
"Prior Publication Date
US 2020/0398235 A1 Dec. 24, 2020"
Insert:
--Foreign Application Priority Data
Jun. 21, 2019 WO ............PCT/US2019/038416--

Signed and Sealed this
Thirtieth Day of July, 2024

Katherine Kelly Vidal
*Director of the United States Patent and Trademark Office*